US011525918B2

(12) United States Patent
Ulrich et al.

(10) Patent No.: US 11,525,918 B2
(45) Date of Patent: Dec. 13, 2022

(54) TIME-OF-FLIGHT CAMERA

(71) Applicant: PMDTECHNOLOGIES AG, Siegen (DE)

(72) Inventors: Stephan Ulrich, Siegen (DE); Lutz Heyne, Netphen (DE)

(73) Assignee: PMDTECHNOLOGIES AG, Siegen (DE)

( * ) Notice: Subject to any disclaimer, the term of this patent is extended or adjusted under 35 U.S.C. 154(b) by 613 days.

(21) Appl. No.: 16/500,704

(22) PCT Filed: Apr. 3, 2018

(86) PCT No.: PCT/EP2018/058456
§ 371 (c)(1),
(2) Date: Oct. 3, 2019

(87) PCT Pub. No.: WO2018/185083
PCT Pub. Date: Oct. 11, 2018

(65) Prior Publication Data
US 2020/0096637 A1   Mar. 26, 2020

(30) Foreign Application Priority Data
Apr. 4, 2017  (DE) .................. 10 2017 205 742.4

(51) Int. Cl.
*G01S 17/36* (2006.01)
*G01S 7/48* (2006.01)
*G01S 17/894* (2020.01)

(52) U.S. Cl.
CPC ............ *G01S 17/36* (2013.01); *G01S 7/4808* (2013.01); *G01S 17/894* (2020.01)

(58) Field of Classification Search
None
See application file for complete search history.

(56) References Cited

U.S. PATENT DOCUMENTS

| 9,426,451 B2 * | 8/2016 | Rhoads | G06T 17/00 |
| 9,625,569 B2 * | 4/2017 | Lange | G01S 17/36 |
| 9,664,790 B2 * | 5/2017 | Wilks | G01S 17/36 |

(Continued)

FOREIGN PATENT DOCUMENTS

| CN | 105991990 A | * 10/2016 | ............ G01S 17/36 |
| CN | 105991990 A | 10/2016 | |

(Continued)

*Primary Examiner* — Reza Aghevli
(74) *Attorney, Agent, or Firm* — Harness, Dickey & Pierce, P.L.C.

(57) ABSTRACT

The disclosure relates to a time-of-flight camera comprising: a time-of-flight sensor having several time-of-flight pixels for determining a phase shift of emitted and captured light, distance values being determined in accordance with the detected phase shifts, characterised in that the time-of-flight camera has a memory in which parameters of a point spread function, which characterise the time-of-flight camera and the time-of-flight sensor, are stored; an evaluation unit which is designed to deploy a detected complex-valued image in Fourier space, in accordance with the stored point-spread function, and a complex-valued image corrected by diffused light is determined and the phase shifts or distance values are determined using the corrected complex-valued image.

13 Claims, 6 Drawing Sheets

State of the Art

(56) References Cited

U.S. PATENT DOCUMENTS

| | | | |
|---|---|---|---|
| 9,678,200 B2 * | 6/2017 | Lange | G01S 7/497 |
| 9,726,762 B2 * | 8/2017 | Wilks | G01S 7/4915 |
| 10,132,626 B2 * | 11/2018 | Steiner | G01S 17/36 |
| 2011/0018967 A1 * | 1/2011 | Mirbach | G01S 7/497 |
| | | | 348/46 |
| 2014/0145722 A1 | 5/2014 | Suzuki | |
| 2014/0285634 A1 | 9/2014 | Rhoads | |
| 2016/0316193 A1 * | 10/2016 | Gruenwald | G01S 17/894 |
| 2017/0090020 A1 * | 3/2017 | Buettgen | G01S 17/36 |
| 2017/0091910 A1 | 3/2017 | Surazhsky et al. | |
| 2017/0146657 A1 * | 5/2017 | Xu | G01S 17/894 |
| 2017/0199276 A1 * | 7/2017 | Liu | G01S 7/497 |
| 2017/0212225 A1 * | 7/2017 | Sommer | G01S 7/4816 |
| 2017/0329012 A1 * | 11/2017 | Büttgen | G01C 3/08 |
| 2018/0059246 A1 * | 3/2018 | Buettgen | G01S 7/4813 |
| 2018/0106892 A1 * | 4/2018 | Parascandola | H01L 27/14603 |
| 2018/0108692 A1 * | 4/2018 | Roessler | H01L 27/14609 |
| 2018/0143321 A1 * | 5/2018 | Skowronek | G01S 17/66 |
| 2018/0146186 A1 * | 5/2018 | Akkaya | G01S 1/00 |
| 2018/0176483 A1 | 6/2018 | Knorr et al. | |
| 2018/0176498 A1 * | 6/2018 | Elkhatib | H04N 5/37457 |
| 2018/0217234 A1 * | 8/2018 | Skowronek | G01S 17/36 |
| 2018/0217235 A1 * | 8/2018 | Skowronek | G01S 7/4814 |
| 2018/0259628 A1 * | 9/2018 | Plank | G01S 7/497 |
| 2018/0292516 A1 * | 10/2018 | Xu | G01S 7/4865 |
| 2019/0072654 A1 * | 3/2019 | Becker | G01S 17/894 |
| 2019/0219696 A1 * | 7/2019 | Xu | G01S 7/4911 |
| 2019/0353767 A1 * | 11/2019 | Eberspach | G01S 7/4808 |

FOREIGN PATENT DOCUMENTS

| | | | | |
|---|---|---|---|---|
| DE | 112008003342 T5 | 1/2011 | | |
| EP | 2073035 A1 * | 6/2009 | | G01S 17/36 |
| EP | 2073035 A1 | 6/2009 | | |
| WO | 2014/145722 A2 | 9/2014 | | |
| WO | 2016/107635 A1 | 7/2016 | | |
| WO | WO-2016107635 A1 * | 7/2016 | | G06T 19/006 |
| WO | WO-2018172766 A1 * | 9/2018 | | G01S 17/36 |

* cited by examiner

State of the Art

State of the Art

TIME-OF-FLIGHT CAMERA

CROSS-REFERENCE TO RELATED APPLICATIONS

This application is a National Stage of International Application No. PCT/EP2018/058456, filed on Apr. 3, 2018, and published in German as WO 2018/185083 A2 on Oct. 11, 2018. This application claims the priority to German Patent Application No. 10 2017 205 742.4, filed on Apr. 4, 2017. The entire disclosures of the above applications are incorporated herein by reference.

FIELD

The disclosure relates to a time-of-flight camera and a method for detecting a point spread function for correcting the detected signals of a time-of-flight sensor.

BACKGROUND

This section provides background information related to the present disclosure which is not necessarily prior art.

The time-of-flight camera or time-of-flight camera systems in particular relate to all time-of-flight or 3D TOF camera systems that derive time-of-flight information from the phase shift of emitted and received radiation. As time-of-flight or 3D TOF cameras in particular PMD cameras including photo mix detectors (PMD) are suited as described for example in DE 197 04 496 C2 and available from the company 'ifm electronic GmbH' or 'pmdtechnologies ag' as Frame Grabber 03D or as CamCube. The PMD camera allows in particular a flexible arrangement of the light source and the detector which can be arranged both in a housing and separately.

SUMMARY

This section provides a general summary of the disclosure, and is not a comprehensive disclosure of its full scope or all of its features.

It is the object of the disclosure to further improve the compensation of phase errors.

This object is achieved in an advantageous manner by the time-of-flight camera system according to the disclosure as specified in the independent claims.

Particularly advantageous is a time-of-flight camera for a time-of-flight camera system provided with a time-of-flight sensor comprising a plurality of time-of-flight pixels for determining a phase shift of emitted and received light, wherein based on the detected phase shifts distance values are determined, wherein the time-of-flight camera comprises a memory in which at least the parameters of a point spread function are stored, wherein the point spread function takes into account a scattered light behavior and signal crosstalk of the time-of-flight camera and the time-of-flight sensor, comprising an evaluation unit, which is designed such that on the basis of the stored point spread function a detected image $(I(x))$ is deconvoluted and a corrected image $(I_0(x))$ is determined, and wherein the determination of the phase shifts or distance values is implemented on the basis of the corrected image $(I_0(x))$.

It is also useful when the deconvolution of the detected image and the stored point spread function is done in the Fourier space.

Preferably, the point spread function is complex-valued.

It is also useful when the deconvolution of the detected image and the stored point spread function is done in the Fourier space.

In a further embodiment it is provided that the detected image is reduced in resolution and a correction is determined with this reduced resolution, and thereafter the correction is scaled up to the original resolution of the detected image and the detected image is corrected with the scaled-up correction.

As a result, the computational effort for the corrections can be significantly reduced.

It is further contemplated to perform the reduction in resolution by averaging amplitudes of adjacent pixels and upscaling by duplicating the amplitudes.

Preferably, the point spread function is stored in the memory as a matrix or a lookup table and/or a Fourier transform.

It is particularly useful if the point spread function stored in the memory is determined according to one of the following methods.

Preferably, a method for determining a point spread function is provided in which a point light source and a time-of-flight camera are arranged such that a time-of-flight sensor of the time-of-flight camera detects the point light source, wherein a distance between the point light source and the time-of-flight camera and/or a beam profile of the point light source are selected such that less than 5 time-of-flight pixels in a pixel row or column or a maximum of 16×16 pixels are illuminated, wherein the point spread function is determined at least on the basis of a subset of the time-of-flight pixels of the time-of-flight sensor.

This procedure has the advantage that for the determination of a point spread function the light source can be constructed in a simple manner within certain limits.

In one embodiment, it is provided to operate the point light source unmodulated.

In this case, the modulation gates of the time-of-flight pixels of the time-of-flight sensor are driven in such a way that charge carriers in the time-of-flight pixel are primarily accumulated only at one integration node. This procedure ensures that the generated photoelectrons are preferably collected at one integration node.

According to a further embodiment, it is provided to drive the point light source and the time-of-flight sensor in phase with a modulation signal and to determine sensor difference signals with respect to at least three different phase positions.

It is particularly useful that at least two image frames with different integration times of the time-of-flight sensor and/or different light intensities of the point light source are provided for determining the point spread function.

In a further embodiment, a method for determining a point spread function for a time-of-flight camera of a time-of-flight camera system is provided in which a first 3D image $I_1(x)$ of a reference scene and a second 3D image $I_2(x)$ with an object in the foreground of the reference scene are detected by means of the time-of-flight camera, wherein the second 3D image $I_2(x)$ or at least a partial area of the second 3D image $I_2(x)$ is corrected by means of a point spread function, and based on a difference between the first and the corrected second 3D image $I'_2(x)$ parameters of the point spread function are changed until the difference between the two images $I_1(x)$, $I'_2(x)$ at least in the selected partial areas is minimal and/or falls below a threshold, wherein the resulting point spread function can be reused as a correction point spread function.

Likewise, a method for determining a point spread function for a time-of-flight camera of a time-of-flight camera system can be provided in which by means of the time-of-flight camera a single image I(x) of a reference scene with an object in the foreground is detected under the assumption that the reference scene is formed as a flat surface, wherein the single image I(x) is corrected by means of a first point spread function, wherein for determining a correction point spread function parameters of the first point spread function are changed until a difference between the corrected image I'(x) and an expected image $I_0(x)$ is minimal and/or falls below a threshold.

In another embodiment, a method for determining a point spread function for a time-of-flight camera of a time-of-flight camera system is provided, in which a 3D image $I_T(x)$ of a step of a reference object is detected by means of the time-of-flight camera, wherein the reference object has a step of defined height and the surfaces of the step are planar and arranged plane-parallel to one another, and the reference object is disposed in relation to the time-of-flight camera so that at the edge of the step a distance jump to the more distant step level is present, wherein the detected 3D image $I_T(x)$ is first corrected by use of a first model point spread function, wherein, when the distance values d of the thus corrected 3D image $I_T(x)$ are outside a maximum allowable distance error, parameters of the model point spread function are changed until the distance values d of the corrected 3D image $I_T(x)$ are minimal and/or are below an allowable distance error, wherein the resulting point spread function can be reused as a correction point spread function.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure will be explained hereinafter in more detail by means of exemplary embodiments with reference to the drawings.

In the drawings:

FIG. 1 schematically shows a time-of-flight camera system;

Corresponding reference numerals indicate corresponding parts throughout the several views of the drawings.

DETAILED DESCRIPTION

In the following description of the preferred embodiments like reference symbols designate the same or similar components.

Figure 1:
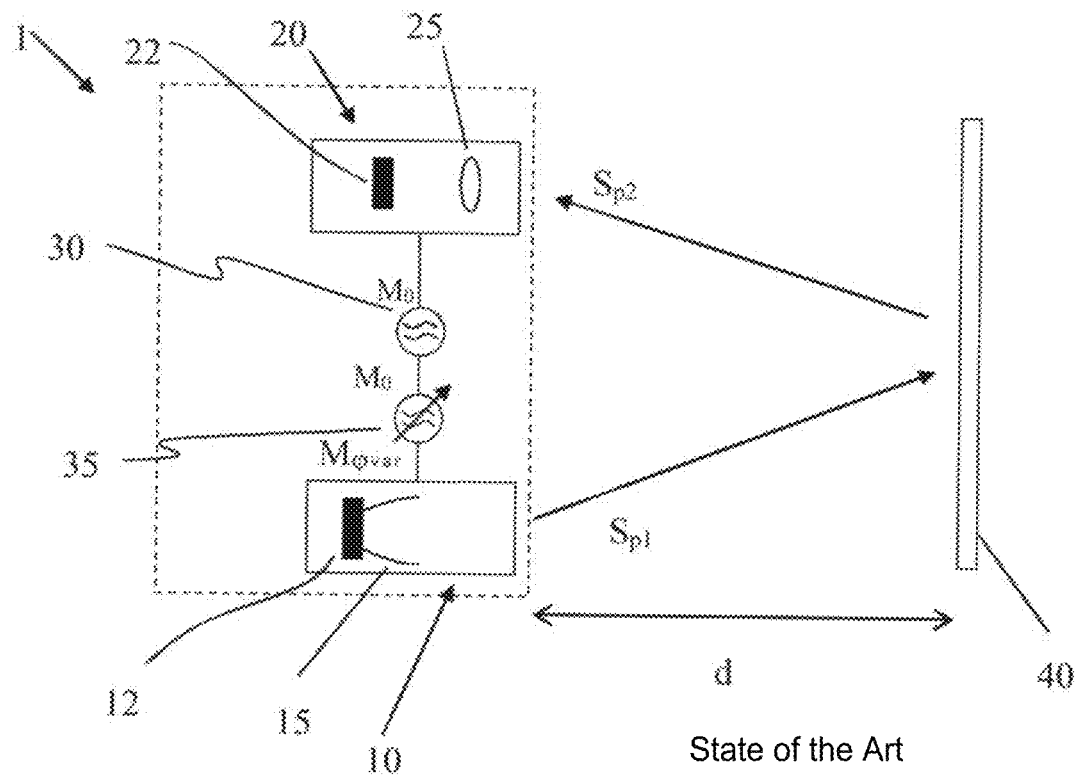

FIG. 1 shows a measurement situation for an optical distance measurement with a time-of-flight camera as known for example from DE 197 04 496 A1.

The time-of-flight camera system 1 comprises an emitting unit or an illumination module 10 comprising a light source 12 and an associated beam-shaping optics 15 as well as a reception unit or time-of-flight camera 20 with a reception optics 25 and a time-of-flight sensor 22.

The time-of-flight sensor 22 has at least one time-of-flight pixel, preferably a pixel array, and is designed in particular as a PMD sensor. The reception optics 25 is typically composed of a plurality of optical elements in order to improve the imaging characteristics. The beam-shaping optics 15 of the emitting unit 10 may be formed, for example, as a reflector or lens optics. In a very simple embodiment, optionally optical elements can be dispensed with both at the reception and the emitting side.

The measurement principle of this arrangement is essentially based on the fact that, based on the phase shift of the emitted and received light the time-of flight and thus the distance travelled by the received light can be determined. For this purpose, the light source 12 and the time-of-flight sensor 22 are supplied in common with a specific modulation signal $M_0$ with a base phase position $\varphi_0$ via a modulator 30. In the example shown, moreover, a phase shifter 35 is provided between the modulator 30 and the light source 12, wherein the phase shifter is able to shift the base phase $\varphi_0$ of the modulation signal $M_0$ of the light source 12 by defined phase positions $\varphi_{var}$. For typical phase measurements, preferably, phase positions $\varphi_{var}=0°$, 90°, 180°, 270° are used.

In accordance with the adjusted modulation signal, the light source 12 emits an intensity-modulated signal $S_{p1}$ with the first phase position p1 or $p1=\varphi_0+\varphi_{0var}$. This signal $S_{p1}$ or the electromagnetic radiation is reflected in the illustrated case by an object 40 and hits due to the distance traveled 2d or the time-of-flight $t_{L3}$ with a phase shift $\Delta_{\varphi0}$ with a second phase position $p2=\varphi_0+\varphi_{var}+\Delta\varphi(t_L)$ onto the time-of-flight sensor 22 as a reception signal $S_{p2}$. In the time-of-flight sensor 22 the modulation signal $M_0$ is mixed with the received signal $S_{p2}$, wherein from the resulting signal the phase shift or the object distance d is determined.

As the illumination source or light source 12 preferably infrared light emitting diodes or surface emitters (VCSEL) are suited. Of course, other sources of radiation in other frequency ranges are conceivable, in particular light sources in the visible frequency range come into consideration.

Figure 2:
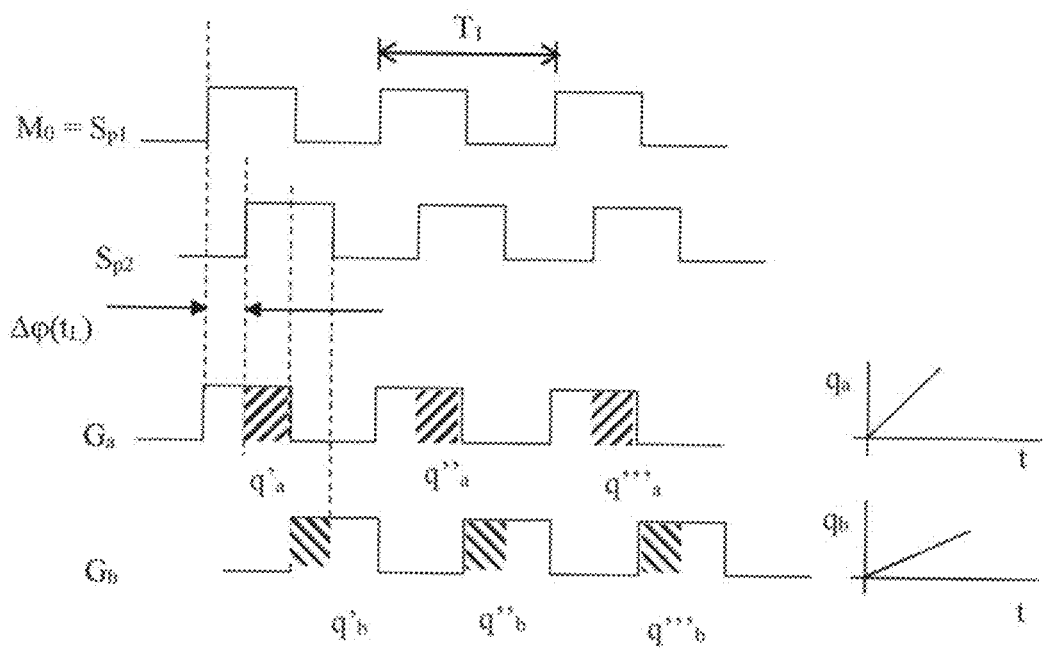
FIG. 2 shows a modulated integration of generated charge carriers.

The basic principle of the phase measurement is shown schematically by way of example in FIG. 2. The upper curve shows the timing of the modulation signal Mo with which the light source 12 and the time-of-flight sensor 22 are driven. The light reflected by the object 40 hits the time-of-flight sensor 22 with a phase shift $\Delta\varphi(t_L)$ as a reception signal $S_{p2}$ according to its time-of-flight $t_L$. The time-of-flight sensor 22 collects the photonically generated charges q over several modulation periods in the phase position of the modulation signal $M_0$ in a first integration node Ga and in a phase position shifted by 180° in a second integration node Gb. For this steering of the charges onto the integration nodes the pixels 23 of the time-of-flight sensor 22 comprise at least two modulation gates Gam, Gbm, which steer the charges onto the first or the second integration node Ga, Gb depending on the applied modulation signals. From the difference of the charges qa, qb collected in the first and in the second integration node Ga, Gb taking into account all phase positions $\varphi_{var}$ the phase shift $\Delta\varphi(t_L)$ and thus a distance d of the object can be determined.

Figure 3:
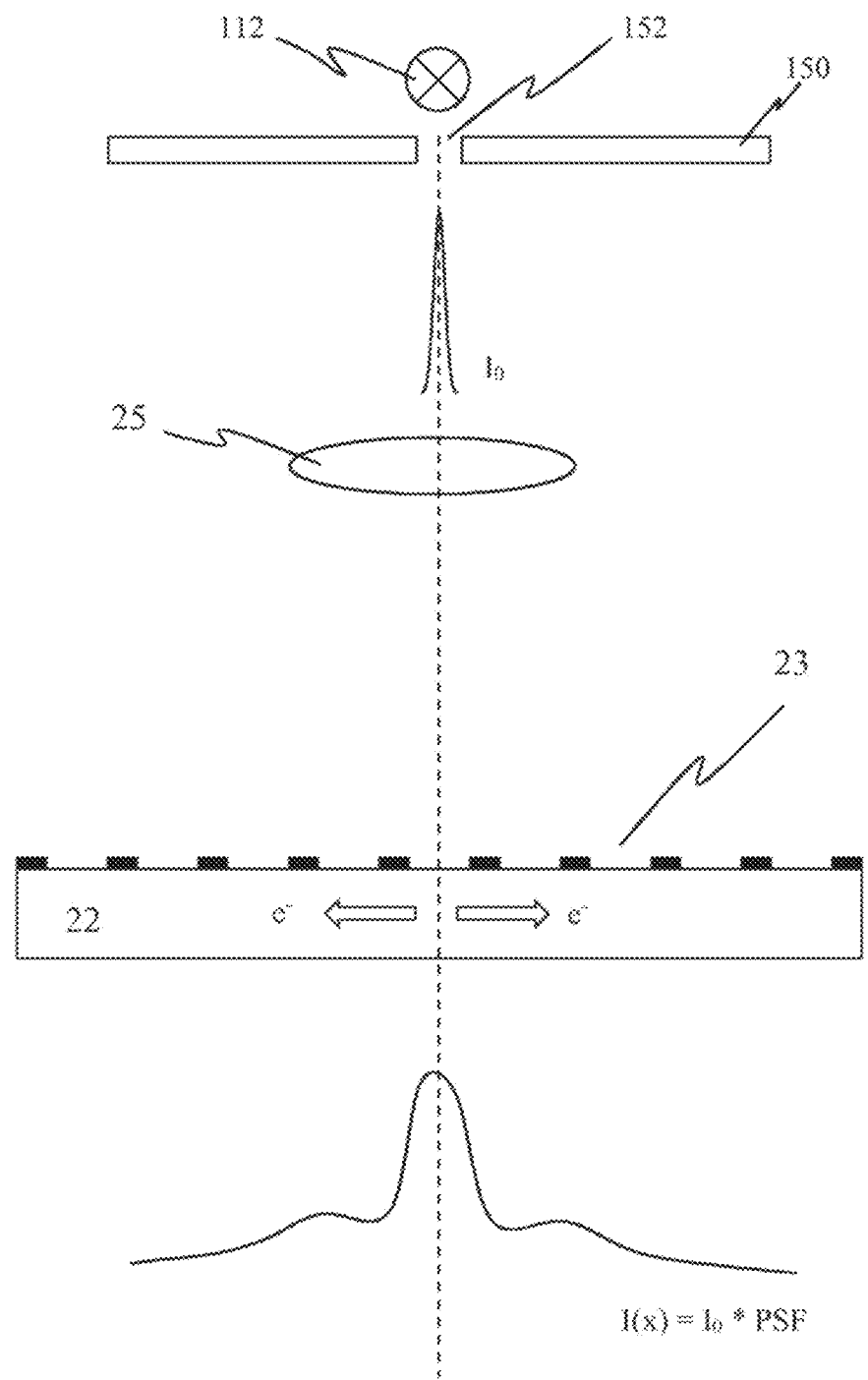
FIG. 3 shows a setup for determining a point spread function.
Figure 4:
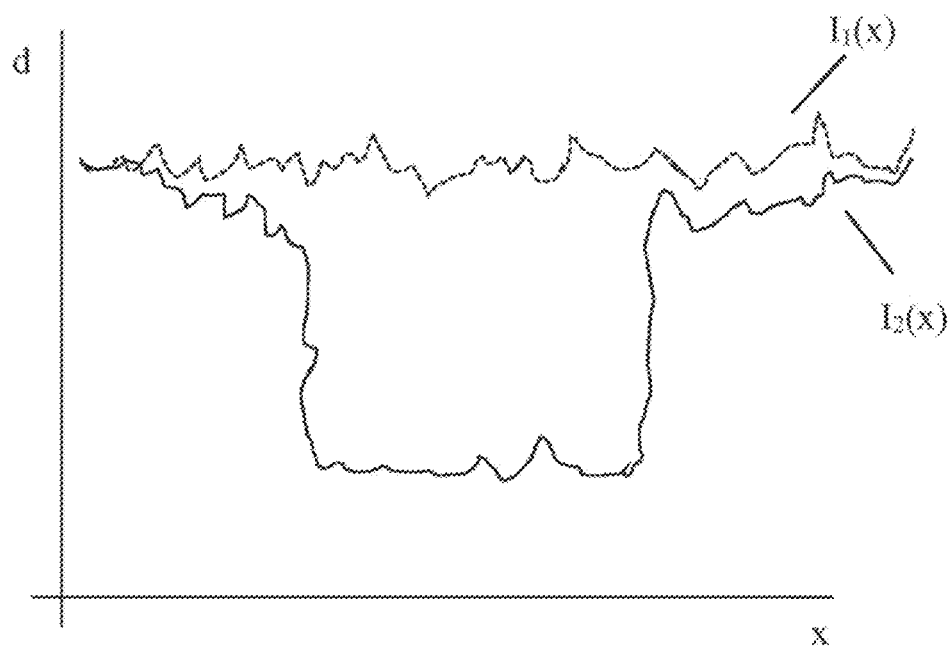
FIG. 4 shows a cross section of images for determining a point spread function.

FIG. 3 schematically shows a setup for determining a point spread function PSF. Here, the light source 112 and the time-of-flight sensor 22 can be operated unmodulated or with at least one predetermined modulation frequency. When using unmodulated light, it is advantageous if the time-of-flight sensor 22 or the pixels 23 are operated unmodulated, too. In this case, it is helpful if a constant voltage is applied to the modulation gates Gam, Gbm of the pixels 23 such that the photogenerated charges are primarily collected only in one integration node Ga, Gb.

In order to determine the PSF, it is preferred that the light source 112 essentially illuminates only one single pixel 23, preferably less than 3×3 and in particular less than 5×5 pixels 23 of the time-of-flight sensor 22. In order to provide such a light spot, an aperture 150 with a sufficiently small aperture opening 152 is provided in front of the light source 112. The original light signal 10 emerging from the aperture 150 is influenced by a variety of impacts on the way to the sensor up to the detected image signal I(x), for example, by characteristics of the optical system or the optics 25 or by reflections between the sensor 22 and the optics 25. Moreover, intrinsic characteristics of the sensor 22 itself play a role, such as signal crosstalk or an electron diffusion between the pixels 23. As a result, the image signal I(x) detected at the sensor can be considered as a convolution between the incoming light $I_0$ and a point spread function PSF, which essentially includes all characteristics of the overall system. Due to the singular illumination of one or a few pixels, the detected image signal I(x) essentially corresponds to the point spread function PSF. For determining the point spread function, preferably all pixels are evaluated. In principle, however, it is also conceivable to evaluate only a partial area around the singularly illuminated pixel.

The quality of the point spread function PSF can be improved, if necessary, if several point spread functions are determined on the basis of a plurality of singularly illuminated pixels 23. For example, it is useful to additionally illuminate pixels 23 outside the optical axis in order to determine further point spread functions at these positions. On the basis of the determined point spread functions, then a point spread function can be determined which is to be used for the later corrections.

Since the mentioned electron diffusion typically occurs at a diffusion rate that is significantly lower than the propagation of light, the electrons reach adjacent pixels with a time delay, so that the influence of electron diffusion also is observable as a phase shift. The point spread function PSF thus also includes complex-valued fractions. For a more accurate determination of these quantities, it is therefore advantageous to operate the light source 112 at different phase positions.

Since a point spread function typically has high dynamics over several powers of ten, it is also advantageous for detecting the PSF to operate the point light source 112 with different intensities and/or the sensor 22 with different integration times.

In order to compensate for dark currents, it is helpful to detect image signals I(x) both when the light source 112 is switched on and off.

From the sum of all measurements, then a model of a point spread function can be generated, which is applicable to all pixels 23.

Such a model can be generated according to the following considerations: Since the measured PSF is noisy and may contain, for example, artifacts that are very specific to the pixel position on the sensor, a "clean" PSF is obtained, for example, by fitting the measured PSF to a suitable model. As a model, for example $$PSF(\vec{x}) = A(\vec{x}) + B(\|\vec{x}\|_{pB}) \quad (1)$$

wherein, for example $$A(\vec{x}) = AO\exp(-s(\|\vec{x}\|p))$$

can be selected.

Here, $\vec{x}$ denotes the distance vector from the central pixel $\vec{x}_0$ of the PSF in pixels and $\|\vec{x}\|_p = (x_1^p + x_2^p)^{1/p}$ denotes the p norm of $\vec{x}$. p=2 would result, for example, in an exactly radial symmetrical PSF. Since the PSF need not necessarily be radially symmetric, but e.g. may be diamond-shaped, p≠2 can give better results. By a suitable choice of the p norm, anisotropies of the PSF can thus be taken into account.

Since most of the light hits on the central pixel of the PSF, it is useful to add to the model a locally narrow function B(r) that reflects that fraction. This can e.g. be a Dirac Delta or a Gaussian function describing, for example, the lens blurring.

For reasons of efficiency, it is advantageous to describe the PSF in the form of a spline curve, for example. In order to describe phase shifts with this PSF, the spline may, for example, have a complex-valued fraction in addition to the real fraction. This makes the PSF complex-valued, too. Suitable fitting parameters are then, for example, the values at the nodes of the splines, the normalization parameters p and pB, as well as parameters that specify the shape of B(r). Instead of storing the entire PSF, it is advantageous to just store the necessary parameters in order to generate the PSF from these parameters when initializing the software.

During operation of the time-of-flight camera, then it is possible to correct the distance values with regard to scattered light influences based on the stored parameters and the PSF generated therefrom.

With the aid of the setup described preferably a first image $\tilde{I}_k(\vec{x})$ with a short exposure time tk is detected. Specifically, the exposure time should be chosen so that none of the pixels is in saturation. In the case where modulated light is used, no pixel of the obtained raw images may be saturated.

In addition, a second image $\tilde{I}_l(\hat{x})$ with a long exposure time $t_l$ is detected. Here, the exposure time should be chosen so that the proportion of the PSF caused by scattered light and/or crosstalk/signal crosstalk is as completely visible as possible, i.e. not affected by noise. The exposure time here is typically 1000-10000 times greater than in the first image.

During the image detection either unmodulated light can be used or the light source and the sensor can be modulated in a usual manner. In the latter case the images $\tilde{I}_k(\vec{x})$ and $\tilde{I}_l(\vec{x})$ are complex-valued as usual, thus containing phase information, which reflects the time from the emission of the light up to the reception of the generated electrons at the gates of the sensor.

For both images, it may be helpful to detect a series of images instead of one image and to average them to further reduce the noise.

For example, in order to obtain consistent values between the first and the second image, the brightnesses (or amplitudes) are normalized with the different integration times:

$$I_l(\vec{x}) = \tilde{I}_l(\vec{x})/t_l$$

$$I_k(\vec{x}) = \tilde{I}_k(\vec{x})/t_k \quad (3)$$

In the images obtained the exact position of the illuminated central pixel $\vec{x}_0$ is generally still unknown. In order to determine the position of the central pixel $\vec{x}_0$, the first image $I_k(\vec{x})$ is binarized, for example, by means of a thresholding method, so that the bright LED spot should result in a contiguous area.

The center of the contiguous area is a good estimate of the central pixel or the center point $\vec{x}_0$ on the sensor onto which the light source is directed. This center point $\vec{x}_0$ need not necessarily fall onto the center of a pixel, i.e. the found position for the center point $\vec{x}_0$ need not be an integer.

Now the image $I_k(\vec{x})$ of the short exposure is fitted to the model of a sharp spot. Such a model is designated for example in equation (1) with $B(\|\vec{x}\|_p)$. Here in particular $$(P_{B,p_B}) = \arg\min_{P_{B,p_B}} \left( \sum_{\vec{x}} \left| I_k(\vec{x}) - B(\|\vec{x} - \vec{x}_0\|_{p_B}) \right|^2 \right) \quad (4)$$

is determined, wherein PB is the parameter of the function B(r) and pB the parameter of the norm. For example, $B(r) = B_0 \exp(-br^2)$ could be chosen, wherein then $P_B = (B_0, b)$.

For the numerical minimization according to equation (4) there are numerous algorithms, such as e.g. the Nelder-Mead method.

In addition to PB and pB, it may give better results in equation (4) if the center $\vec{x}_0$ of the light source is included in the optimization. Then the previously found value from the binarized image would be suitable as a starting value.

Now we consider the second image $I_l(\vec{x})$ with the long exposure time. Analogously to equation (4), the image is fitted to the model of the scattered light signature, $A(\vec{x})$ in equation (1):

$$(P_{A,p_A}) = \arg\min_{P_{A,p_A}} \left( \sum_{\vec{x}} \left| I_l(\vec{x}) - A(\|\vec{x} - \vec{x}_0\|) \right|^2 \right) \quad (5)$$

If necessary, the central portion of the PSF described by B(r) can be disregarded.

Analogous to the first fit, here $P_A$ are the parameters of the model function $A(\vec{r})$. For example, a function of the form:

$$A(\vec{r}) = A_0 \exp(-s(\|\vec{r}\|_{p_A}) + i\Phi(\vec{r})) \quad (6)$$

proved to be appropriate, wherein s(r) represents a (real) spline curve. The function $\Phi(\vec{r})$ describes a phase delay of the incident light spot, which may be caused, for example, by phase crosstalk/signal crosstalk between the pixels. Since this is not necessarily isotropic, it may be necessary to model $\Phi(\vec{r})$ as a two-dimensional function (e.g., a 2D spline or a 2D lookup table) instead of assuming a radially symmetric function as for s(r).

The fit parameters $P_A$ are in this case $A_0$, $p_A$, as well as the function values of the splines at the nodes. If necessary, the position of the nodes can also be part of the fit parameters $P_A$.

For example, with the obtained parameters $P_A$ and $P_B$, as well as the PSF model according to equation (1) it is now possible to generate an artifact-free and non-noisy PSF. Instead of storing the complete PSF, it is advantageous to store only these or other appropriate parameters from which the PSF can be generated during the initialization of the software.

It is preferably provided to process the images detected with different exposure times separately from each other:

$$PSF(\vec{x}) = A_1(\vec{x}) + A_2(\vec{x}) + \ldots \quad (7)$$

The sub-models A1 $(\vec{x})$, A2$(\vec{x})$, ... may for example correspond to different dynamic ranges of the PSF and can each be fitted separately from each other to detected images $I_1(\vec{x}), I_2(\vec{x}), \ldots$. Based on these fit parameters, the PSF can then be summarized according to equation (7).

In the foregoing, the calibration has been described with reference to a point light source with an aperture as the light source or light source system. Of course, the calibration is not limited to such a light source, but all light sources or light source systems come into consideration, which are able to generate a suitable light spot.

FIGS. 4 to 9 show further methods for determining a suitable point spread function PSF. In the method according to FIG. 4, a first 3D image $I_1(x)$ of a reference scene and a second 3D image $I_2(x)$ with an object 40 in the foreground of the reference scene are detected. As already discussed, a change in the distance values known from the first 3D image $I_1(x)$ is to be expected due to systemic influences. In order to determine a point spread function suitable for the correction, then parameters of a first model PSF are varied until differences between the first and the second image, in particular distance errors, are minimal or smaller than an allowable limit. Here, preferably only the image areas or a partial area thereof are considered, in which the reference scene is visible in both images.

Figure 5:
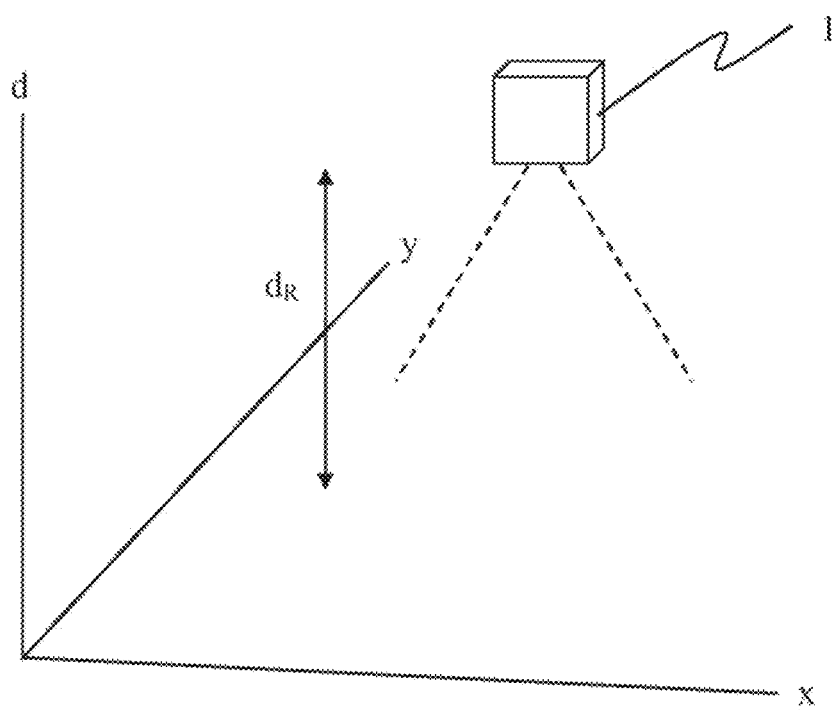
FIG. 5 shows a detection of a reference scene.
Figure 6:
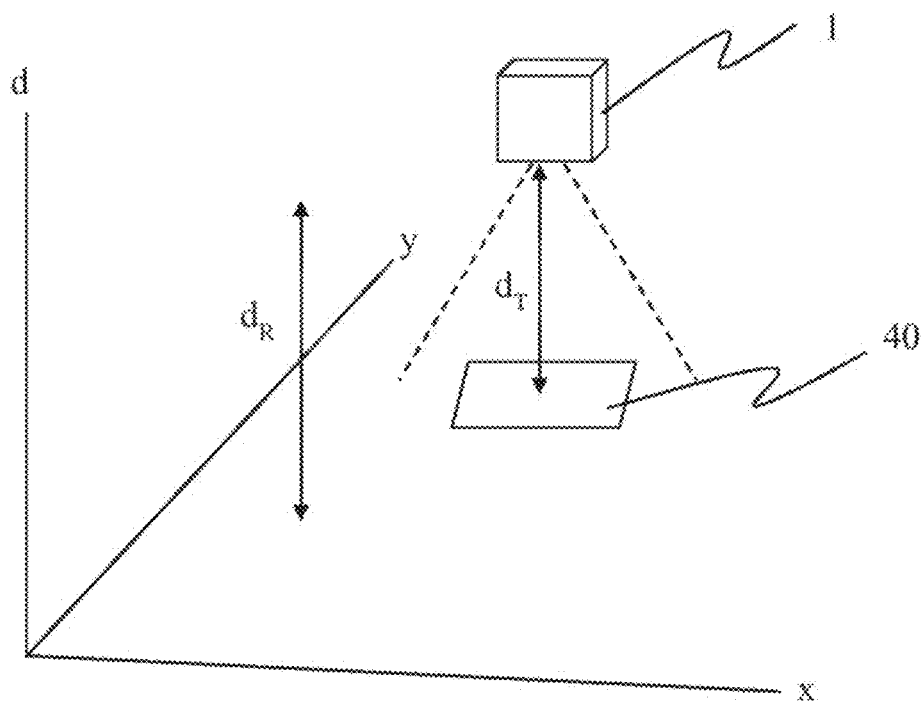
FIG. 6 shows a detection of an object in front of the reference scene.

For example, the images may be detected as shown in FIGS. 5 and 6. In a first step, a first 3D image $I_1(x)$ of a reference scene is detected (FIG. 5). As a reference scene, for example, a wall or a floor can be detected in a simple manner, but in principle any scenes with an arbitrary height profile can be detected. In the second step according to FIG. 6, an object is disposed above the reference scene, for example a hand or another object, and a second distance image $I_2(x)$ is detected. Again, the characteristics of the object are essentially uncritical. As described with reference to FIG. 4, a correction PSF can then be generated on the basis of the difference between the two images.

Figure 7:
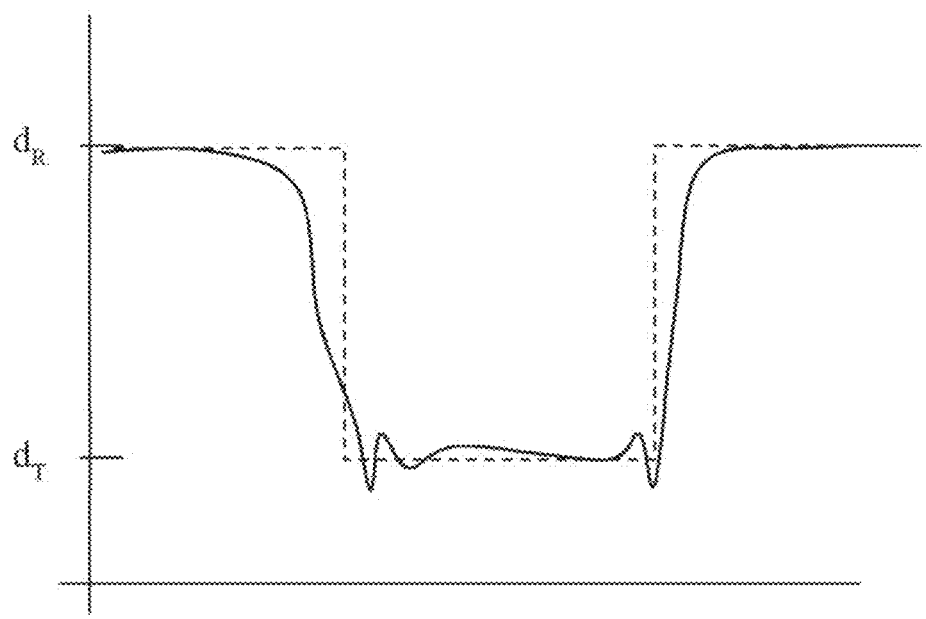
FIG. 7 shows measured distance values according to FIG. 6 in relation to the actual distances.

FIG. 7 shows a variant in which the reference scene and the object are flat and disposed plane-parallel to each other. With such prior knowledge, the optimization of the PSF can possibly be simplified.

Alternatively, for example, it is possible to detect only one image of a target at a sufficient distance from a flat reference scene or plane (e.g., wall, table, floor) instead of two images. In order to determine the PSF, the parameters are now varied until the reference surface behind the target is as flat as possible, or the deviations of the corrected reference surface from a plane are smaller than an allowable limit.

It is particularly advantageous if the dimensions and distances of the reference scene and/or the introduced target are known in advance.

Figure 8:
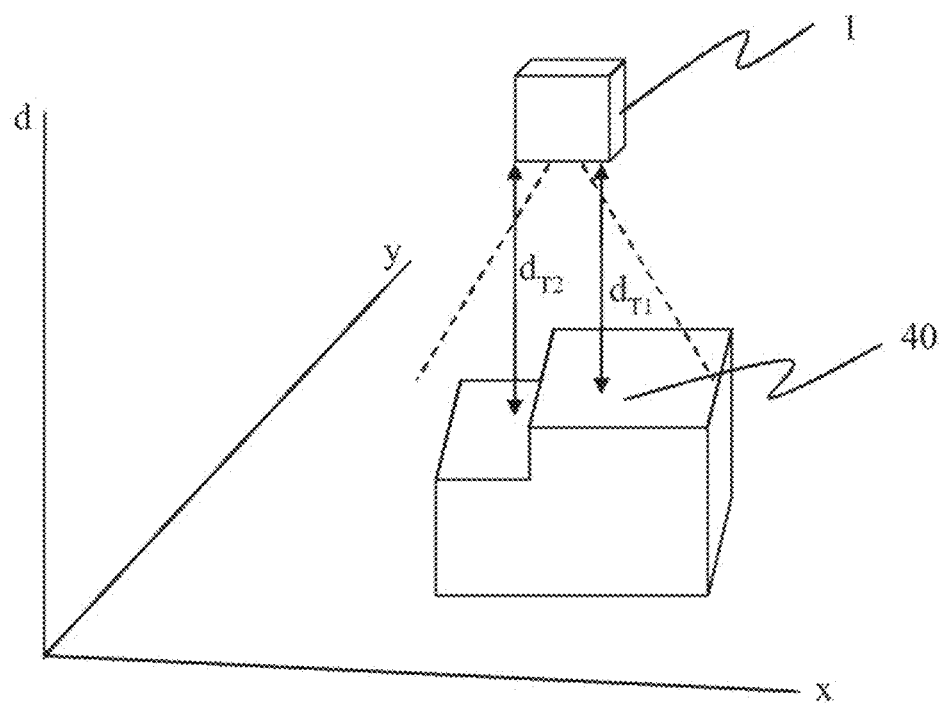
FIG. 8 shows a detection of two reference surfaces with different distances.
Figure 9:
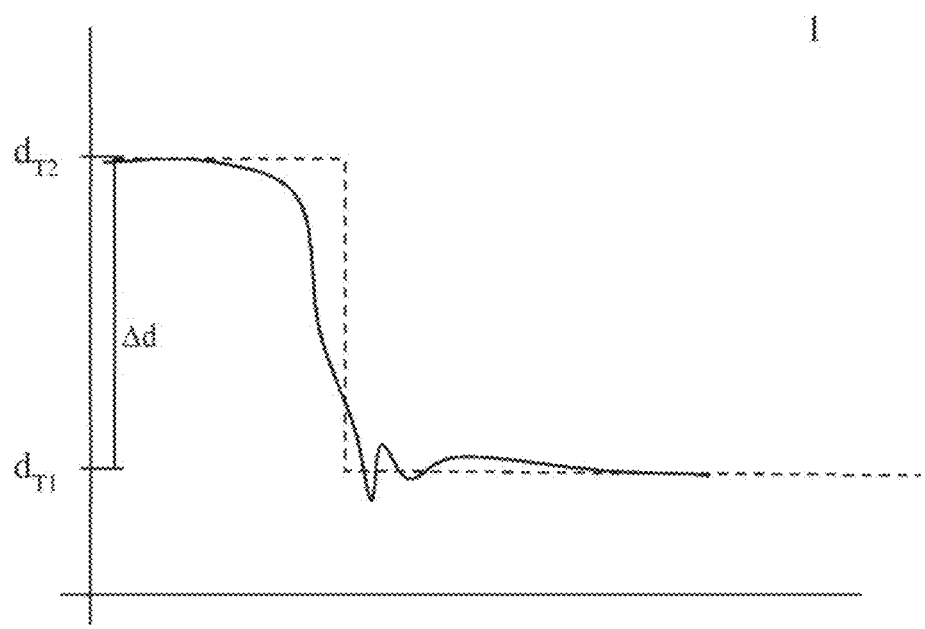
FIG. 9 shows measured distance values according to FIG. 8 in relation to the actual distances.
Figure 10:
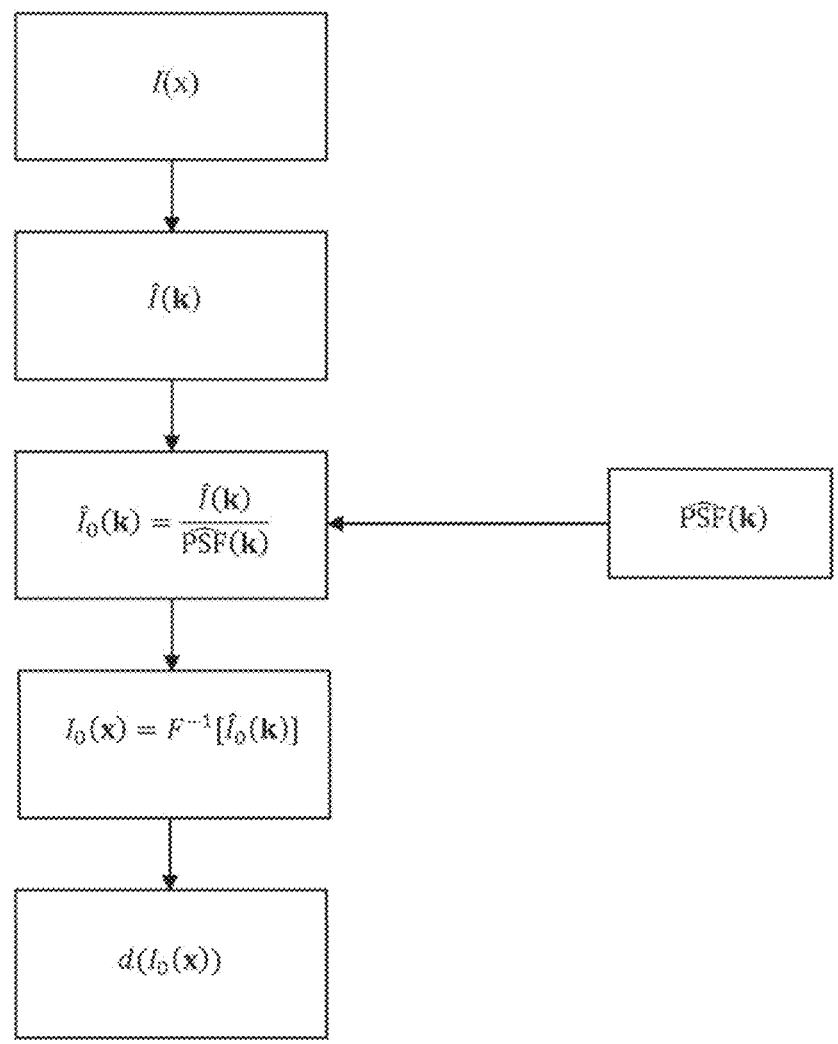
FIG. 10 shows a possible schematic flow of the scattered light correction in the sense of the disclosure.

FIGS. 8 and 9 show a further variant of the above procedure. The object 40 shown in FIG. 8 has a step defined in height. The height $\Delta d = d_{T2} - d_{T1}$ is preferably previously known. As in the abovementioned example the parameters of a PSF model are varied until the distance error is minimal or below an allowable limit.

The raw images Dj (for example j=0, 1, 2, 3 corresponding to the phase positions 0°, 90°, 180°, 270° measured by the sensor are in a mathematical sense a convolution of the unknown raw images $D_j^0$ not distorted by scattered light with the PSF:

$$D_j(x) = \Sigma_{\Delta x} D_j^0(x - \Delta x) \cdot PSF(\Delta x) \tag{8}$$

Interesting for further processing are the complex-valued images (8)

$$I(x) := (D0(x) - D2(x)) + i(D1(x) - D3(x)) \tag{9}$$

Since the convolution is a linear operation, the same applies analogous to I(x) and the complex-valued image $I_0(x)$ not distorted by scattered light:

$$I(x) = \Sigma_{\Delta x} I_0(x - \Delta x) \cdot PSF(\Delta x) \tag{10}$$

or $$I(x) = I_0(x) \cdot PSF(x) \tag{11}$$

The deconvolution is executed in the Fourier space. For this purpose, I(x) and the PSF are Fourier transformed (F[•]): $\hat{I}(k) = F[I(x)]$ and $\widehat{PSF}(k) = F[PSF(x)]$. Thus, equation 4 becomes:

$$\hat{I}(k) = \hat{I}_0(k) \cdot \widehat{PSF}(k) \tag{12}$$

and thus $$\hat{I}(k) = \frac{\hat{I}(k)}{\widehat{PSF}(k)} \tag{13}$$

This gives the image not distorted by scattered light $$I_0(k) = F^{-1}[\hat{I}_0(k)] \tag{14}$$

If one is interested in the correction $\Delta I(x) := I0(x) - I(x)$, i.e. the difference between the detected and the corrected image, Eq. (13) can be rearranged as follows:

$$\Delta \hat{I}(k) := \hat{I}_0(k) - \hat{I}(k) = \hat{I}(k)\left(\frac{1}{\widehat{PSF}(k)} - 1\right)$$

wherein $\Delta \hat{I}(k) = F[\Delta I(x)]$ analogous to the above treatment is the Fourier transform of the correction $\Delta I(x)$.

This correction can e.g. be scaled down or reduced in resolution for performance reasons prior to the Fourier transformation and can be scaled up again to the original resolution after a scattered light correction. The correction thus obtained may subsequently be added to the detected image I(x) in order to obtain the corrected image $I_0(x)$.

Due to the data reduction of course, the computational effort is reduced, too.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A time-of-flight camera for a time-of-flight camera system, comprising:
a time-of-flight sensor with a plurality of time-of-flight pixels for determining a phase shift of emitted and received light, wherein based on the detected phase shifts distance values are determined;
a memory in which at least parameters of a point spread function are stored, wherein the point spread function considers a scattered light behavior and signal crosstalk of the time-of-flight camera and the time-of-flight sensor; and
an evaluation unit, which is configured such that based on the stored point spread function a detected image is convoluted and a corrected image is determined,
wherein the phase shifts or distance values are determined from the corrected image,
wherein the point spread function stored in the memory has been determined in which a point light source and the time-of-flight camera are disposed such that the time-of-flight sensor of the time-of-flight camera detects the point light source,
wherein a distance between the point light source and the time-of-flight camera and/or a beam profile of the point light source are selected such that on the time-of-flight sensor less than 5 time-of-flight pixels in a pixel row or column or a maximum of 16×16 pixels are illuminated, and
wherein the point spread function is determined at least based on a subset of the time-of-flight pixels of the time-of-flight sensor.

2. The time-of-flight camera according to claim 1, wherein the point spread function is complex-valued.

3. The time-of-flight camera according to claim 1, wherein the deconvolution of the detected image and the stored point spread function is implemented in the Fourier space.

4. The time-of-flight camera according to claim 1, wherein the detected image is reduced in resolution and a correction is determined with this reduced resolution, whereupon the correction is scaled up to the original resolution of the detected image and the detected image is corrected with the scaled-up correction.

5. The time-of-flight camera according to claim 4, wherein the reduction of the resolution is carried out by averaging amplitudes of adjacent pixels and the up-scaling is implemented by duplication of the amplitudes.

6. The time-of-flight camera according to claim 1, wherein the point spread function is stored as a matrix or lookup table in the memory.

7. The time-of-flight camera according to claim 1, wherein the point spread function is stored as Fourier transform in the memory.

8. The time-of-flight camera according to claim 1, wherein the point spread function is stored on an external device and the correction of the phase shifts or distance values is implemented on the external device.

9. A method for determining a point spread function in which a point light source and a time-of-flight camera are disposed such that a time-of-flight sensor of the time-of-flight camera detects the point light source;
wherein a distance between the point light source and the time-of-flight camera and/or a beam profile of the point light source are selected such that on the time-of-flight sensor less than 5 time-of-flight pixels in a pixel row or column or a maximum of 16×16 pixels are illuminated; and wherein the point spread function is determined at least based on a subset of the time-of-flight pixels of the time-of-flight sensor.

10. The method according to claim 9, wherein the point light source is operated unmodulated.

11. The method according to claim 10, wherein modulation gates of the time-of-flight pixels of the time-of-flight sensor are driven such that charge carriers in the time-of-flight pixel are predominantly accumulated only at one integration node.

12. The method according to claim 9, wherein the point light source and the time-of-flight sensor are driven in phase with a modulation signal, and sensor difference signals are determined for at least three different phase positions.

13. The method according to claim 9, wherein for determining the point spread function at least two image frames are detected with different integration times of the time-of-flight sensor and/or different light intensities of the point light source.

* * * * *